US012120267B2

(12) United States Patent
Plain et al.

(10) Patent No.: US 12,120,267 B2
(45) Date of Patent: Oct. 15, 2024

(54) FEDERATED INTELLIGENT CONTACT CENTER CONCIERGE SERVICE

(71) Applicant: Avaya Management L.P., Durham, NC (US)

(72) Inventors: Kevin R. Plain, Dacono, CO (US); John Young, Buntingford (GB)

(73) Assignee: Avaya Management L.P., Durham, NC (US)

( * ) Notice: Subject to any disclaimer, the term of this patent is extended or adjusted under 35 U.S.C. 154(b) by 78 days.

(21) Appl. No.: 17/748,025

(22) Filed: May 18, 2022

(65) Prior Publication Data
US 2023/0379409 A1    Nov. 23, 2023

(51) Int. Cl.
*H04M 3/493* (2006.01)
*G10L 15/06* (2013.01)
*G10L 15/16* (2006.01)
*H04L 9/00* (2022.01)

(52) U.S. Cl.
CPC ......... *H04M 3/4936* (2013.01); *G10L 15/063* (2013.01); *G10L 15/16* (2013.01); *H04L 9/50* (2022.05)

(58) Field of Classification Search
CPC ...... H04M 3/4936; H04L 9/50; G10L 15/063; G10L 15/16
USPC ...................................................... 379/88.18
See application file for complete search history.

(56) References Cited

U.S. PATENT DOCUMENTS

| 8,634,543 | B2 | 1/2014 | Flockhart |
| 10,554,817 | B1* | 2/2020 | Sullivan ............... H04L 41/5054 |
| 11,416,819 | B2 | 8/2022 | George et al. |
| 2010/0235218 | A1 | 9/2010 | Erhart et al. |
| 2010/0296417 | A1 | 11/2010 | Steiner |
| 2011/0125793 | A1 | 5/2011 | Erhart et al. |
| 2011/0125826 | A1 | 5/2011 | Erhart et al. |
| 2018/0124238 | A1* | 5/2018 | Shah ................... H04L 65/1089 |
| 2021/0209292 | A1* | 7/2021 | Varma .................. H04L 51/216 |
| 2023/0168944 | A1* | 6/2023 | Karlin ..................... G06F 9/505 718/104 |
| 2023/0198776 | A1* | 6/2023 | Andrade ............... H04L 9/3242 713/168 |
| 2023/0201725 | A1* | 6/2023 | Dalmia ................ G06Q 20/385 463/40 |
| 2023/0342864 | A1* | 10/2023 | Bagade ................. G06F 40/279 |

* cited by examiner

*Primary Examiner* — Binh Kien Tieu
(74) *Attorney, Agent, or Firm* — Sheridan Ross P. C.

(57) ABSTRACT

Customers often call a contact center to resolve an issue only to find the contact center cannot resolve the customer's issue and instead requires a third party to perform some action. By monitoring a customer's communication with an agent, an automated process may generate a workflow to address the issue comprising at least one action to be performed by a third party. The third party is then contacted, in real-time or offline, and provided with their actions to be performed. Records are written to a blockchain describing authentications, actions to take and by whom, and the completion of such actions. The resulting success, or lack thereof, is provided as feedback to further refine the accuracy of the automatic determinations of the workflow and/or the identity of the particular third parties.

20 Claims, 7 Drawing Sheets

FEDERATED INTELLIGENT CONTACT CENTER CONCIERGE SERVICE

FIELD OF THE DISCLOSURE

The invention relates generally to systems and methods for automated workflow generation and particularly to multi-party workflow generation and processing.

BACKGROUND

A significant pain point for a customer when dealing with a company's call center is that the resolution of an issue may involve more than one unrelated company. Each company may have its own call center. For example, a customer may have an issue, such as an error, with a bank that also involves a mortgage company, a pharmacy that also involves a doctor, an internet service provider, etc. Customers are often sent back and forth between multiple unrelated (i.e., separately operated) company call centers in an effort to identify a root cause and properly communicate the root cause to the correct company(s) for resolution.

This can be very frustrating because an agent for one company's contact center may point the finger of blame to another company and leave the customer to figure out what can be very complex, intercompany issues. For example, a customer writes a check to pay their mortgage with the correct numerical amount but accidently includes a typo in the spelled-out amount. The mortgage company finds the typo and records the check using the spelled-out amount and thus under credits the customer's account, and the underpayment may result in a late fee for the customer. However, the bank records and transfers the correct numerical amount, which the mortgage company is unaware of. The customer may need to make numerous calls to the mortgage company and to the bank, ultimately requiring the bank to send a notarized statement to the mortgage company asserting that the correct funds had been transferred.

SUMMARY

Customers may be unaware of the need to contact multiple companies to resolve an issue. Even if they are aware, they have to guess which company to call first and may get the "run-around" by being told by a first company that they need to contact a second company only to be told by the second company they need to contact the first or a third company. Often each call requires an extended time on hold or navigating a decision tree. In the end, the customer may be required to serve as mediator to resolve the issue between the companies, a skill not all customers have or want to use.

These and other needs are addressed by the various embodiments and configurations of the present invention. The present invention can provide a number of advantages depending on the particular configuration. These and other advantages will be apparent from the disclosure of the invention(s) contained herein.

As a general introduction to the embodiments herein, the present disclosure is generally directed to a network of inter-company call center members dynamically linked together to collaboratively resolve issues for commonly held customers in real-time on a single/multiple channels.

In one embodiment, a standardized interface and logic is provided for unrelated companies to be identified and dynamically link their call centers and their agents together for solving a problem for a common customer of the unrelated companies.

For sensitive data, privacy of the customer's data and compliance with privacy standards (GDPR, HIPAA, PCI, etc.) are maintained by requiring a customer to authorize a joint call, such as between a patient, medical provider, and pharmacy. A three-(or more) way call may temporarily comprise a one-to-one connection between the patient and either the medical provider or the pharmacy, exclusively, to obtain the necessary authentications and permissions to satisfy the legal requirements to allow one provider to share their customer's information with the other party.

In another embodiment, records may be maintained in a blockchain to provide a persistent record of the information gathered or provided, and actions taken and their effect. The following solution components comprise the concierge service.

In another embodiment, a Concierge Intelligent Orchestrator (CIO) is disclosed. The CIO may be embodied as an artificially intelligent agent, such as a neural network trained via machine learning. The CIO monitors the interactions; utilizing natural language processing, determines an issue from the expressed intentions of the parties, audibly during a call or textually during a text exchange; and identifies and connects the required entities to perform the resolution or portions thereof. The CIO may dynamically create workflows wherein portions of the workflow are addressed by one or more entities.

The CIO formulates the workflow from the intents and entities, as keys for selection of a suitable workflow template from its library. The CIO updates and/or customizes the workflow template. The workflow may be presented to the consumer or other end-user for approval. The workflow will then be executed between the consumer and relevant business(es) within the concierge ecosystem.

In another embodiment, supervised learning will be deployed for the AI models so that once an interaction has been initiated, the customer will be asked for direct feedback about the appropriateness of the initiated action. The responses will provide subsequent training to the AIs.

In another embodiment, a Concierge Blockchain (CB) is provided. The CB serves as a transaction backbone and immutable audit log for all transactions that occur within the ecosystem. Interactions between consumer and relevant contact centers are recorded as time-stamped cryptographic hashes on the blockchain. The audit log provides a permanent record of all interactions.

Smart Contract functionality may be included on the Concierge Blockchain for the purpose of supporting the further automation of some interactions between consumer and business(es). Since the blockchain also functions as a notification service to the participating parties within an interaction, it is envisioned that some aspects of workflow can be automated by using smart contracts.

In another embodiment, a Concierge Blockchain Server (CBS) is provided, such as to provide blockchain wallet functionality, including enabling the concierge service to access the Concierge Blockchain. Participating third parties within the concierge ecosystem will also require blockchain wallet functionality to access the concierge blockchain.

In another embodiment, a Concierge Identity Service (CIS) is provided, such as to authenticate third-party participants in order to be granted access to the service. This CIS server may deploy a variety of multi-factor authentication methods including voice/facial biometric checks, and/or use of one-time codes that are sent via SMS/email, etc.

In another embodiment, a Concierge Conferencing Server (CCS) is provided, such as to create an ad hoc voice, video, or digital communications between various parties as they undertake steps to support the consumer. These communication sessions may involve the consumer and contact center agents from multiple businesses from the ecosystem. Other communication sessions might only involve the specific businesses that are needed to address a consumer's request.

Exemplary aspects are directed to:

A system, comprising:
  a server;
  a network interface to a network; and
  wherein at least one processor of the server performs:
    connecting, via the network, to a customer communication device for a communication comprising an audio portion comprising speech provided by a customer utilizing the customer communication device and wherein the communication is a real-time communication;
    analyzing the speech to identify a work item;
    upon determining the work item requires an action from a third party, analyzing the speech to identify the third party;
    constructing a workflow comprising a number of steps that, when each step has been completed, resolves the work item;
    providing at least one third-party step of the number of steps to the third party that, when complete, performs the action; and
    performing at least one host step of the number of steps.

A method, comprising:
  connecting, via a network, to a customer communication device for a communication comprising an audio portion comprising speech provided by a customer utilizing the customer communication device and wherein the communication is a real-time communication;
  analyzing the speech to identify a work item;
  upon determining the work item requires an action from a third party, analyzing the speech to identify the third party;
  constructing a workflow comprising a number of steps that, when each step has been completed, resolves the work item; and
  providing at least one third-party step of the number of steps to the third party that, when complete, performs the action.

A system, comprising:
  means to connect a customer communication device for a communication comprising an audio portion comprising speech provided by a customer utilizing the customer communication device and wherein the communication is a real-time communication;
  means to analyze the speech to identify a work item;
  means to, upon determining the work item requires an action from a third party, analyze the speech to identify the third party;
  means to construct a workflow comprising a number of steps that, when each step has been completed, resolves the work item; and
  means to provide at least one third-party step of the number of steps to the third party that, when complete, performs the action.

A system on a chip (SoC) including any one or more of the above aspects or embodiments described herein.

One or more means for performing any one or more of the above aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
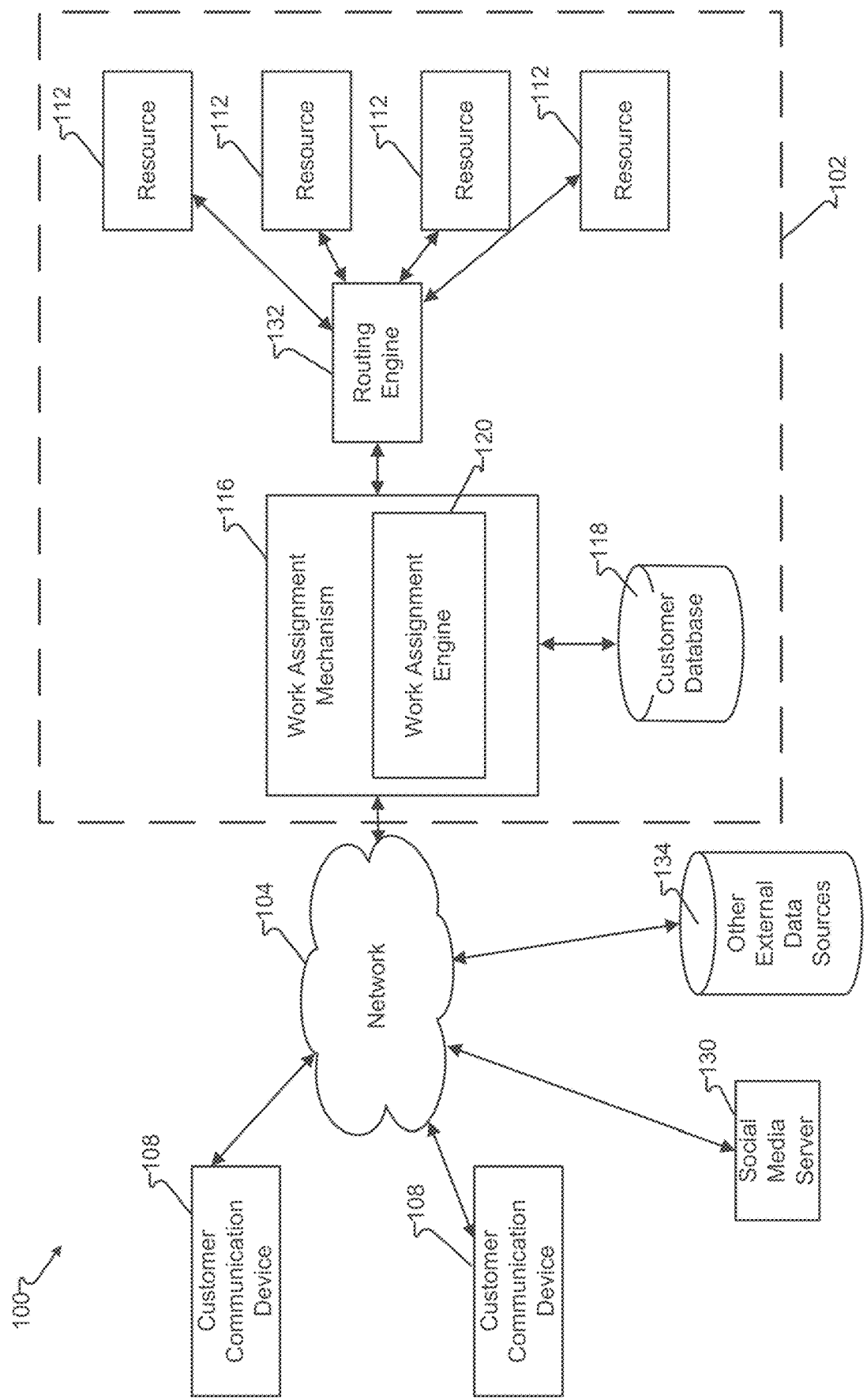
FIG. 1 depicts a system in accordance with embodiments of the present disclosure.

FIG. 1 depicts communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are themselves, or are associated with, work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other components may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134, may be within contact center 102 physically and/or logically, but still be considered external for other purposes (e.g., system administration). For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through various telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The customer communication devices 108 may correspond to a particular customer(s). In accordance with at least some embodiments of the present disclosure, a customer may utilize their customer communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resource location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media server 130 or network of servers. Exemplary architectures for harvesting social media communications and generating work items based thereon are described in U.S. patent application Ser. Nos. 12/784,369, 12/706,942, and 12/707,277, filed May 20, 2010, Feb. 17, 2010, and Feb. 17, 2010, respectively; each of which is hereby incorporated herein by reference in its entirety.

The format of the work item may depend upon the capabilities of the customer communication device 108 and/or the format of the communication. In particular, work items are logical representations of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the customer communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the customer communication devices 108 may comprise any type of known communication equipment or collection of communication equipment. Examples of a suitable customer communication device 108 includes, but are not limited to, a personal computer, laptop, Personal Digital Assistant (PDA), cellular phone, smart phone, telephone, or combinations thereof. In general, each customer communication device 108 may be adapted to support video, audio, text, and/or data communications with other customer communication devices 108 as well as the processing resources 112. The type of medium used by the customer communication device 108 to communicate with other customer communication devices 108 or processing resources 112 may depend upon the communication applications available on the customer communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more hardware components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage hardware components may be dedicated to the operator of contact center 102 or shared or distributed amongst a plurality of service provider customers, one being contact center 102.

In one embodiment, a message is generated by customer communication device 108 and received via communication network 104 at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
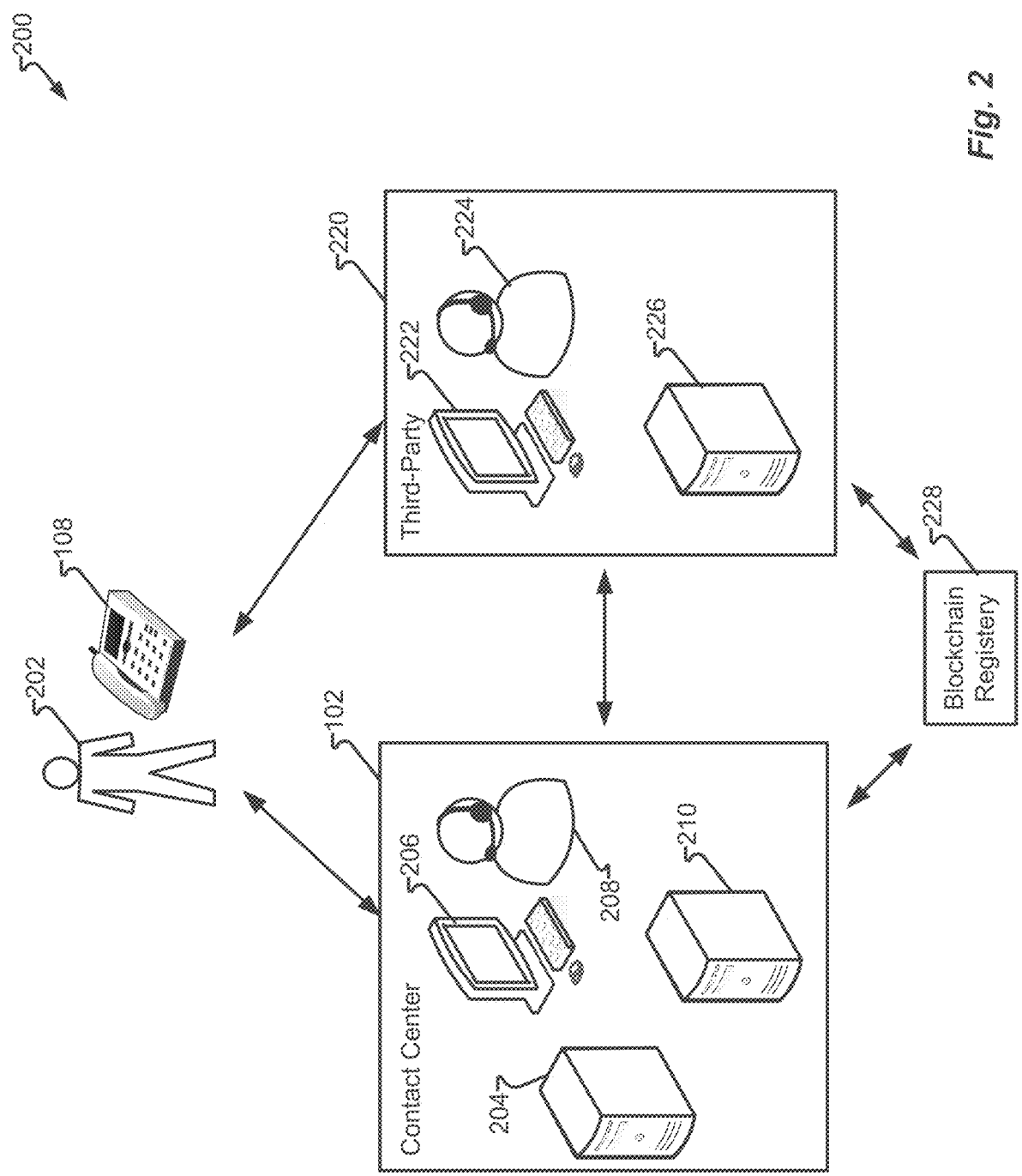
FIG. 2 depicts a system in accordance with embodiments of the present disclosure.

FIG. 2 depicts system 200 in accordance with embodiments of the present disclosure. In one embodiment, a customer interacts with contact center 102 such as to address a work item. Customer 202, utilizing customer communication device 108, is connected with contact center 102 via communication network 104 (see FIG. 1) for communicating thereon. Contact center 102 may deploy a number of resources 112, such as agent 208 utilizing agent communication device 206 and/or automated agent 210. Automated agent 210 may be an interactive voice response (IVR) system, such as to obtain generally required information from customer 202 (e.g., name, customer/account number, issue, etc.) or deploy more sophisticated logic, such as AI to resolve work items automatically. If the work item is simple, such as customer 202 requests easily identified and provided information (e.g., "What is my account balance?") then automated agent 210 may resolve the work item. Additionally or alternatively, agent 208 may be utilized, such as to identify and/or resolve issues that cannot be resolved by automated agent 210.

In another embodiment, server 204 comprises one or more processors executing instructions to monitor the interaction between customer 202 and agent 208 and/or automated agent 210 to identify a work item and further determine if the work item requires a third party, such as third-party contact center 220, or if resolution of the work item can be performed by contact center 102 alone. Server 204 may determine that the monitored content indicates resolution of the work item by contact center 102 alone cannot be obtained, however, resolution may be obtained upon a third party, such as third-party contact center 220, performing an action. The action is variously embodied and may comprise providing information to customer 202 and/or contact center 102, obtaining information such as to modify a data record maintained by third-party contact center 220, perform an action, etc. The action performed by third-party contact center 220 may entirely resolve the work item or be a portion of the number of actions, some performed by contact center 102 and some performed by third-party contact center 220.

In another embodiment, server 204 generates a workflow to comprise the action(s) to be performed by contact center 102 and the action(s) to be performed by third-party contact center 220 that, when complete, resolve the work item. The actions may be encoded as blocks and wrote to blockchain registry 228 to maintain an immutable record of the actions. Additionally or alternatively, the blocks of blockchain registry 228 may comprise "smart contracts" that, once the corresponding action has been performed, will execute computer code within the block, such as to send a message indicating the block has been completed, trigger execution of the next block, etc.

In another embodiment, server 204 may determine the specific identity of the third party, such as third-party contact center 220 versus another third party. Server 204 may monitor the communication and/or re-evaluate the entirety of the communication from a recording to identify cues or other information as to the identity of the third party. For example, the communication may comprise content such as speech from customer 202 indicating a particular issue (e.g., an issue with bandwidth preventing watching a streaming service). If contact center 102 is providing service to the internet service provider utilized by customer 202, server 204 may determine that a workflow should be created comprising at least one action to be performed by third-party contact center 220, such as the streaming service provider. Accordingly, server 204 may identify the particular third party contact center 220 from an earlier recorded/buffered portion of the communication and/or real-time communication content.

In another embodiment, contact center 102 may connect to third-party contact center 220 in real-time, such as to resolve the issue. Accordingly, server 204 may execute conferencing instructions and hardware to include third-party contact center 220, such as third party agent 224 utilizing agent communication device 222 and/or third party automated agent 226, into the communication. Authentication may be required, such as to any one or more of customer 202, contact center 102, and third-party contact center 220 to be authenticated to at least one other of customer 202, contact center 102, and third-party contact center 220.

Authentication may be variously embodied. For example, authentication may be a simple proof of identity of one party to another, as described in the preceding embodiment, or more complex. In one embodiment, and as a portion of determining the workflow, server 204 may determine authentication rules to utilize to authenticate the parties based on attributes of the parties involved, other portions of the workflow, the work item to address, and/or other data. For example, customer 202 may authenticate themselves to one party, such as contact center 102, to resolve an internet service issue. However, if the issue requires a third party, such as contact center 220 (e.g., a streaming service), another person (not shown) such as a member of the same household having an address in common with the address of customer 202, may be required to be authenticated to contact center 220. However, server 204 may have rules, such as weighing the risk of damage (e.g., health, financial misappropriation, exposure of sensitive data to unauthorized parties, etc.) and conclude that the other member of the household, that has the same address as customer 202, may not be required in any authentication process. In other words, server 204 determines there is sufficient trust with customer 202 alone to resolve a work item solely related to a technical issue.

If the work item included matters of privacy or risked exposure of sensitive information (e.g., financial information, medical records, private data, etc.) such as customer 202 attempts to obtain the particular credit card number the streaming services are paid from, server 204 may execute an appropriately trained AI to select rules, which may include a rule that requires authentication from the actual account holder and/or indicate the level of trust is not sufficient when only customer 202 is authenticated with contact center 102. Rules indicate the particular means by which another party may be authenticated and/or authorize another party (e.g., customer 202) to be authorized as a proxy. For example, a pharmacy (e.g., or other medical provider held to a high degree of care for all patient data) may contacted by customer 202 and require the actual patient to be authenticated in writing to the patient's physician in order to address medical issues. However, another work item may cause server 204 to select different rules. For example, if customer 202 is a member of the same household as another party and the work item is an inquiry when a previously out-of-stock prescription for the other party may be picked up, a more lenient rule may be selected, such as one wherein customer 202 alone may be authenticated.

Resolution of the work item may be performed in real-time by third-party contact center 220. For example, in the case of a streaming service provider, there may be a known service disruption that is currently being addressed. Accordingly, the resolution may be to notify customer 202 to wait and the issue will be resolved. In other situations, the resolution of the work item may be more involved and require a number of actions, which may need to be performed in a particular order. Some actions are to be performed by contact center 102 and some actions are to be performed by third-party contact center 220. As a further option, customer 202 may be required to perform at least one action.

Recording the actions and their status (e.g., pending, in progress, completed, failed, etc.), actions may be encoded and wrote to blockchain registry 228. Contact center 102 and third-party contact center 220 may receive notifications of the status of all issues and/or only certain events, such as notification that a prerequisite action has been completed and a subsequent action may be initiated.

In another embodiment, server 204 monitors the communication with customer 202 and/or third-party contact center 220 and the state of entries in blockchain registry 228 to determine the success or lack of success in identifying the particular third party and/or determining the workflow that successfully resolved the work item. Work items that were successfully resolved may be processed as feedback, such as to up-weight or take other action to make such correct determinations more likely to be repeated in a subsequent communication comprising substantially the same content. Conversely, if server 204 incorrectly identified the particular third party and/or generated a workflow or at least one action within the workflow that failed to successfully resolve the work item, then server 204 will down-weight or otherwise take an action to make it less likely to be repeated in a subsequent communication comprising substantially the same content. For example, if agent 208 and third party agent 224 determine actions, different from the ones generated by server 204, server 204 may incorporate those actions in a subsequent workflow comprising substantially the same content.

Figure 3:
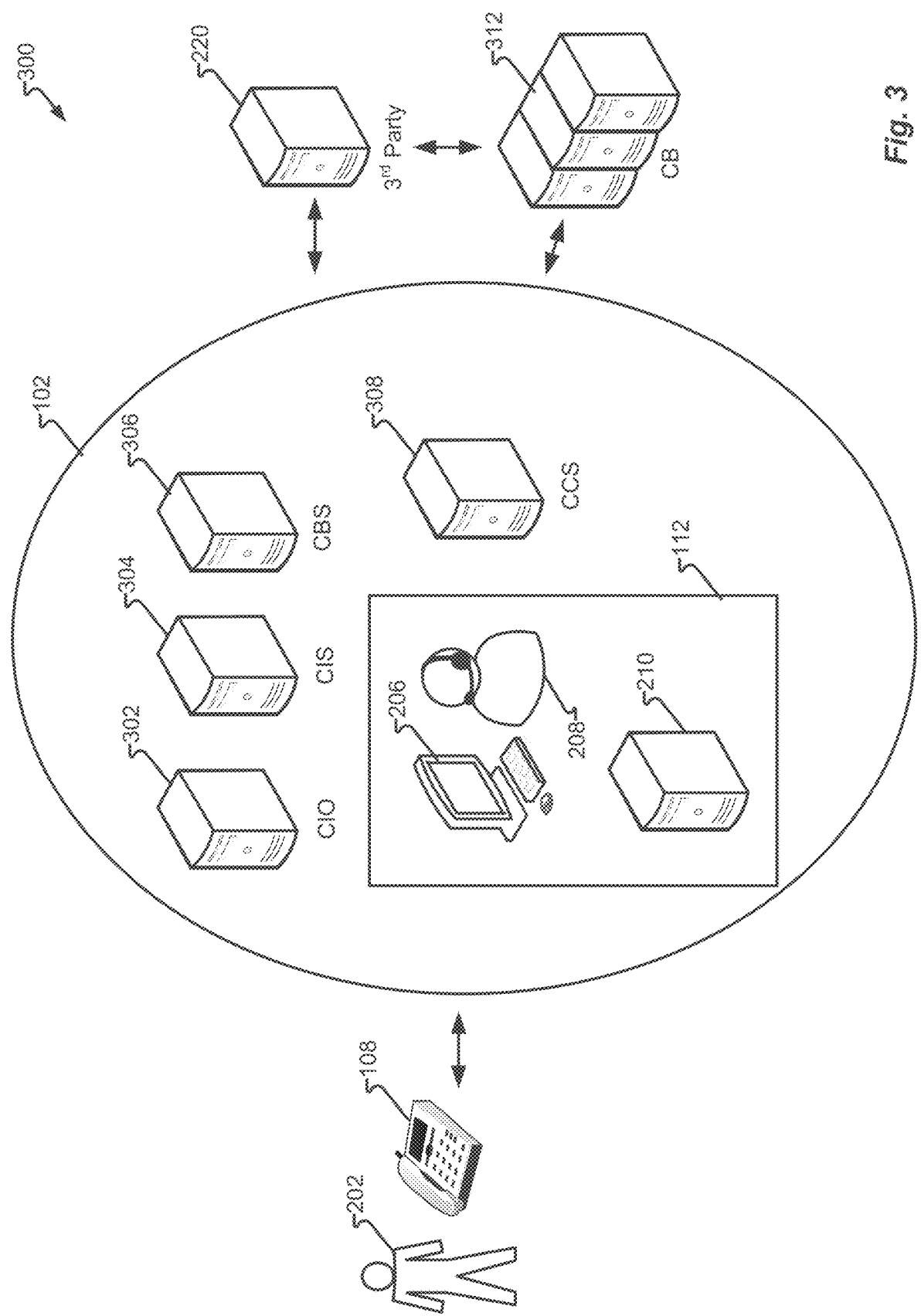
FIG. 3 depicts a system in accordance with embodiments of the present disclosure.

FIG. 3 depicts system 300 in accordance with embodiments of the present disclosure. System 300 depicts a number of computing devices, such as servers, having a single function. The embodiment illustrated is one topology, but one of ordinary skill in the art will appreciate that the functionality of one server may be combined with one or more functions of other servers without departing from the scope of the embodiments provided. Additionally or alternatively, any one or more servers may have their described functionality distributed across one or more servers. It should also be appreciated that a server as used herein comprises one or more processors (i.e., microprocessors) for carrying out instructions maintained in a non-transitory memory to perform the designated function(s) or process (es). Servers may be virtual servers in that the underlying hardware may be static or dynamically allocated to perform a particular function and provide the appearance to a calling function of a dedicated computing hardware device. Accordingly, servers may be hardware devices utilized to dynamically execute a virtual server and thereby give the appearance of executing the functions on the virtual server (e.g., "cloud" computing). Additional details and topologies are described with respect to FIG. 7.

In one embodiment, a call is received by contact center 102 and routed to one of a number of resources 112 (see FIG. 1). In another embodiment, contact center 102 initiates the call to customer 202, via customer communication device 108, such as by executing a call-back process to connected to customer 202. The call may initially be processed by automated agent 210, such as an IVR, or other automated processor and/or connected to agent communication device 206 utilized by agent 208. The resulting communication with customer 202 comprises communication content (e.g., speech, textual messages, etc.) monitored by concierge intelligent orchestrator 302.

In another embodiment, concierge intelligent orchestrator 302 invokes concierge identity service 304 to perform authentication. Authentication may be one-way (i.e., customer 202/customer communication device 108 to contact center 102 only, contact center 102 to customer 202/customer communication device 108 only or bi-directional (i.e., customer 202/customer communication device 108 and contact center 102 to each other). Authentication may comprise the exchange of known data (e.g., username and password), multifactor authentication (e.g., sending a challenge or code to a device associated with customer 202 but different from customer communication device 108 and/or that utilizes a different channel and network address, such as SMS).

In another embodiment, concierge intelligent orchestrator 302 invokes concierge blockchain server 306 to write the results of the forementioned authentication process to concierge blockchain 312. Concierge blockchain 312 is illustrated as a plurality of computers, such as servers, each maintaining a copy of the registry comprising the blockchain.

In one example, customer 202 calls contact center 102 operating as a pharmacy to resolve an issue with a prescription. After authenticating customer 202 as a known customer with an account with the pharmacy, agent 208 is connected with customer 202 to resolve a problem with a prescription (e.g., a work item). Concierge intelligent orchestrator 302 monitors the communication with a natural language processing unit and determines that a resolving workflow comprises at least one action that must be performed by a third party, such as the customer's doctor. Actions of the workflow may be required to be performed by contact center 102 ("host" actions). It should be appreciated that while a single third party (i.e., third-party contact center 220) is described, two or more third parties may be utilized in a similar manner wherein each additional third party is identified in a workflow as necessary to perform at least one action, connected to engage in the communication, authenticated, and monitored. As a further option, the communications with third-party contact center 220 (or any additional third party) may be offline (e.g., email, text message, voice mail, etc.). When non-real time communications are utilized, additional steps may be added to the workflow, such as identifying the urgency, contact center 102, any particular communication requirements (e.g., "call Agent Smith at 800.800.8000 extension 123"), or other actions that may be necessary to resolve the issue utilizing a form of communication other than the communication currently comprising customer communication device 108 and resource 112.

Concierge intelligent orchestrator 302 recommends to customer 202 and/or agent 208/automated agent 210 that adding a third party (e.g., the doctor) to the communication would be beneficial to resolving the work item. If refused, other means to seek a resolution may be pursued. If approved, concierge intelligent orchestrator 302 invokes concierge conference server 308 to connect to third-party contact center 220, which may be a human or automated agent. Third-party contact center 220 is illustrated as a server as one embodiment and may comprise only communication equipment. However, computing equipment, such as routers, switches, load balancers, etc., may also be utilized and represented by third-party contact center 220. Concierge conference server 308 may then write a record of the approval to connect, the connection, and/or other attributes of the communication comprising third-party contact center 220 to concierge blockchain 312.

Now, customer 202, resource 112 (agent 208 and/or automated agent 210), and third-party contact center 220 are connected and may resolve the issue. For example, the doctor's office may reissue a prescription and provide it to the pharmacy and thereby resolve the work item. Actions taken, or agreed to be taken, may be encoded as blocks and wrote to concierge blockchain 312. The success or failure to resolve the issue may be provided back to concierge intelligent orchestrator 302, such as to encourage/discourage a similar workflow from being generated for subsequent calls having a similar work item.

Figure 4:
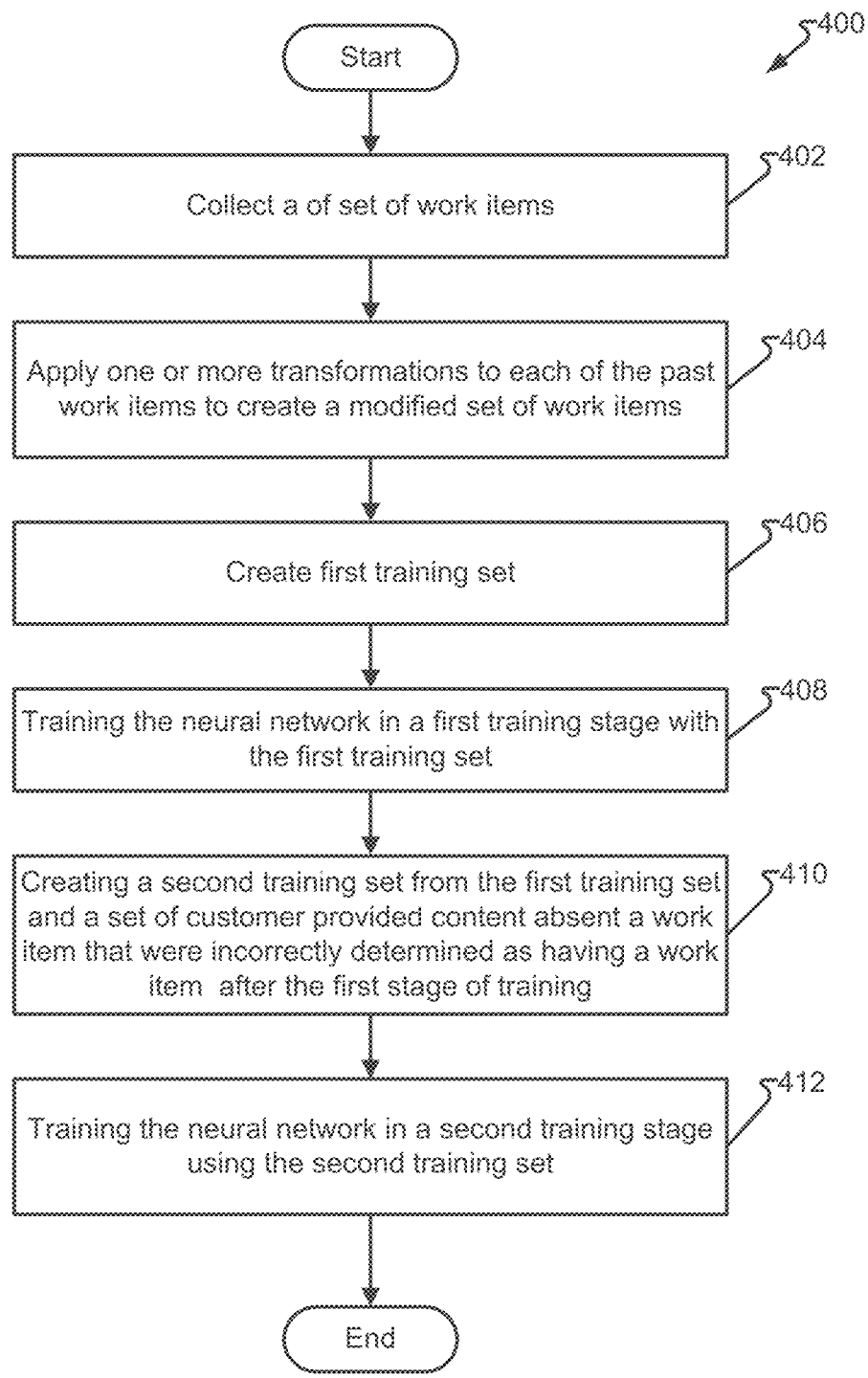
FIG. 4 depicts a process in accordance with embodiments of the present disclosure.

FIG. 4 depicts process 400 in accordance with embodiments of the present disclosure. In one embodiment, process 400 is embodied as machine-readable instructions maintained in a non-transitory memory that when read by a machine, such as processors of a server, cause the machine to execute the instructions and thereby execute process 400. The processor of the server may include, but is not limited to, at least one processor of server 204, concierge intelligent orchestrator 302, concierge identity service 304, concierge blockchain server 306, or concierge conference server 308.

Process 400 utilizes, executes, and/or trains, at least in part, a neural network. Once trained, the neural network may be provided with communication content, such as from customer 202 via customer communication device 108, and may receive from the neural network a work item to be resolved by contact center 102 and/or at least one third party (e.g., third-party contact center 220). A neural network, as it is known in the art and in one embodiment, self-configures layers of logical nodes having an input and an output. If an output is below a self-determined threshold level, the output is omitted (i.e., the inputs are within the inactive response portion of a scale and provide no output). If the self-determined threshold level is above the threshold, an output is provided (i.e., the inputs are within the active response portion of a scale and provide an output). The particular placement of the active and inactive delineation is provided as a training step or steps. Multiple inputs into a node produce a multi-dimensional plane (e.g., hyperplane) to delineate a combination of inputs that are active or inactive.

Process 400 begins and, in step 402, a set of work items are collected from a data storage. The work items may be expressed as a portion of spoken or textual content provided during a previous customer's or previous customers' prior communication(s) with resource(s) 112. The work item, when expressed by a previous customer, may be in natural language form and/or express a customer-observed issue by the previous customer(s) to be resolved. Step 404 provides one or more transformations to create a modified set of work items. The modifications may include, but are not limited to, substituting a word with a synonymous word, substituting a word with a synonymous phrase, substituting a purpose for a topic associated with the purpose, substituting the topic associated with the purpose of the communication with the purpose, inserting at least one redundant word, removing at least one redundant word, removing a first unique topic, and adding a second unique topic.

Step 406 creates a first training set comprising the collected set of work items, the modified set of work items, and a set of customer provided content absent any work item. Step 408 trains the neural network in a first training stage with the first training set. Step 410 creates a second training set for a second stage of training. The second training set comprises the first training set and a set of customer provided content that is absent any work item but was incorrectly determined as comprising a work item after the first training stage. Additionally or alternatively, the second training stage may include work items that were misidentified as a different work item or an incomplete work item that, when resolved, failed to resolve or completely resolve the issue raised in the customer provided content. Step 412 then trains the neural network in the second training stage using the second training set.

Figure 5:
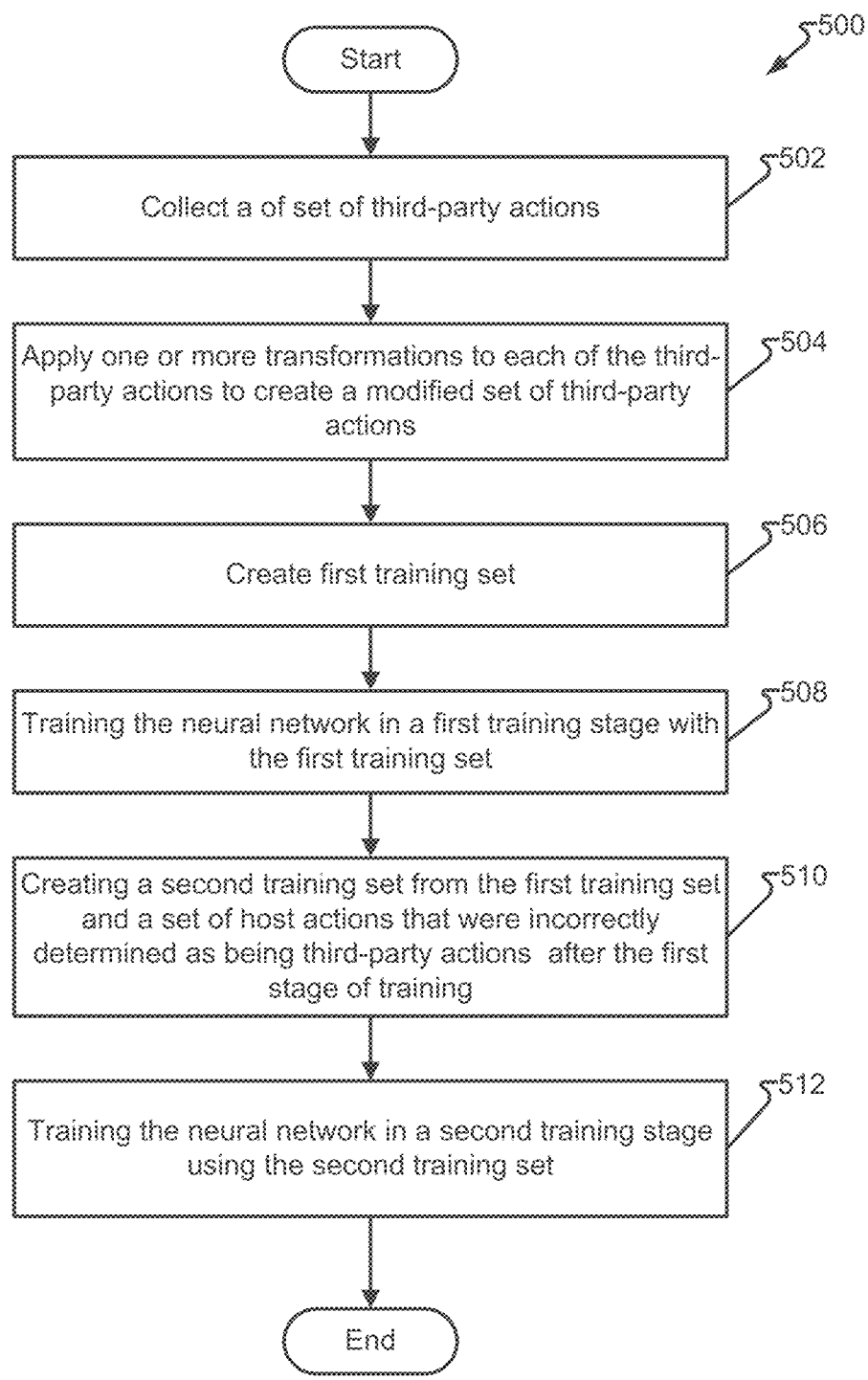
FIG. 5 depicts a process in accordance with embodiments of the present disclosure.

FIG. 5 depicts process 500 in accordance with embodiments of the present disclosure. In one embodiment, process 500 is embodied as machine-readable instructions maintained in a non-transitory memory that when read by a machine, such as processors of a server, cause the machine to execute the instructions and thereby execute process 500. The processor of the server may include, but is not limited to, at least one processor of server 204, concierge intelligent orchestrator 302, concierge identity service 304, concierge blockchain server 306, or concierge conference server 308.

Process 500 utilizes, executes, and/or trains, at least in part, a neural network. Once trained, the neural network may be provided with communication content, such as from customer 202 via customer communication device 108 and/or a resource 112, and receive from the neural network a third party (e.g., third-party contact center 220) having at least one action to perform to resolve the work item.

Process 500 begins and, at step 502, collects a set of third-party actions from a data storage. The third-party actions may be expressed as a portion of spoken or textual content provided during a previous customer's or customers' prior communication(s) with resource(s) 112. The action, when expressed by a previous customer and/or resource 112, may be in natural language form and/or expressed as an observed issue by the previous customer(s) and/or resource 112 or explicit action, as a portion of a workflow to be performed by a third party, or a particular third party, as a required step in order to resolve a work item expressed in the prior communication(s).

Step 504 applies one or more transformations to each third-party action to create a modified set of third-party actions. The modifications include, but are not limited to, substituting a third-party service for a third-party name, substituting a third-party name for a third-party service, substituting a third-party action for a third-party name, substituting a third-party name for a third-party action, substituting a work item topic for a third-party name, and substituting a third-party name for a work item subject.

Step 506 creates a first training set comprising the collected set of third-party actions, the modified set of third-party actions, and a set of communication content, such as from prior communication(s), that are absent a third-party action. Additionally or alternatively, at least one prior communication may comprise a misidentified third-party action, such as an action that is incorrectly identified as a third-party action but was subsequently determined to be a host action, or an incomplete action wherein the third party was subsequently determined to require to perform an additional action.

Step 508 trains the neural network in a first training stage with the first training set. Step 510 then creates a second training set comprising the first training set and a set of host actions that were incorrectly determined to be third-party actions after the first stage of training. Step 512 then trains the neural network in the second training stage using the second training set.

Figure 6:
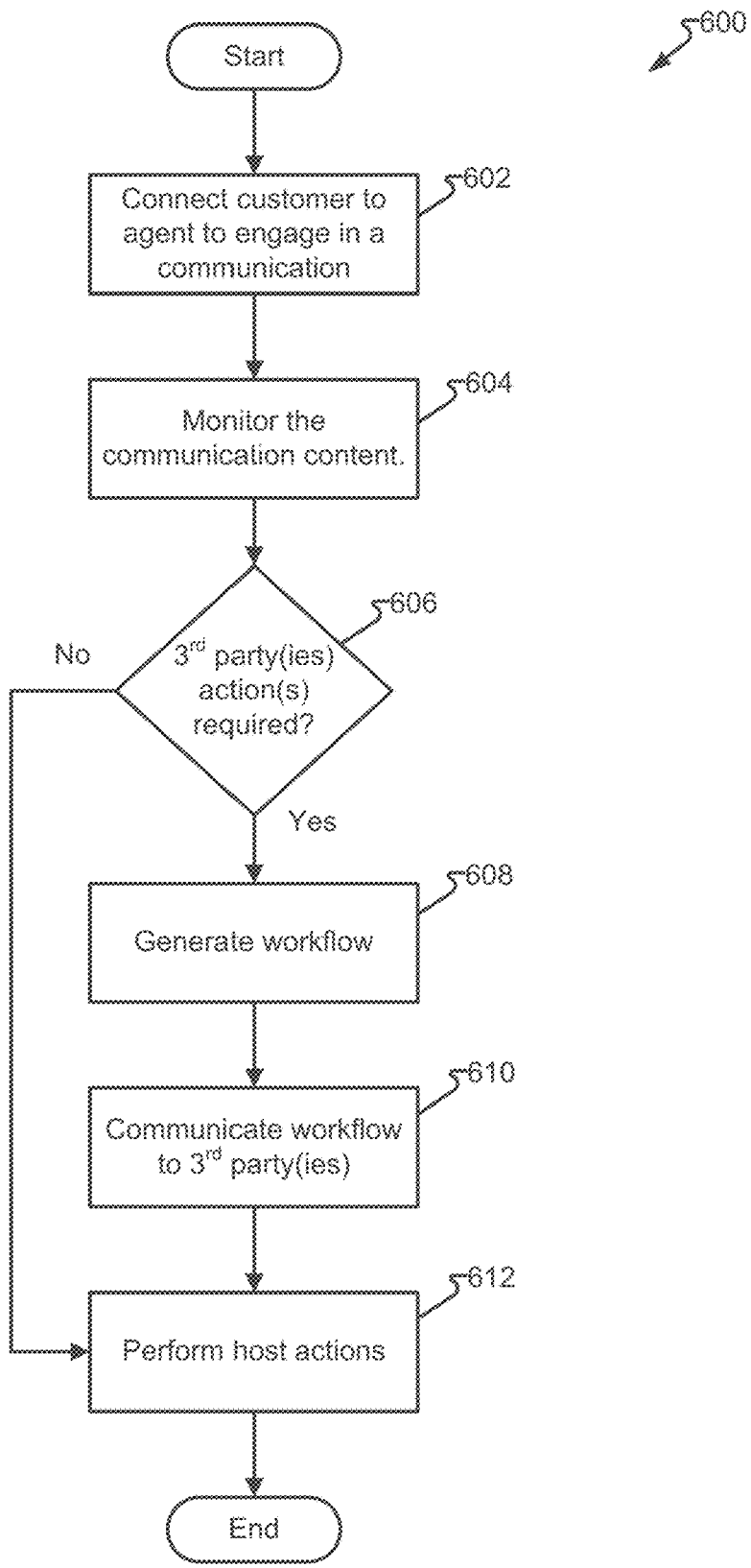
FIG. 6 depicts a process in accordance with embodiments of the present disclosure.

FIG. 6 depicts process 600 in accordance with embodiments of the present disclosure. In one embodiment, process 600 is embodied as machine-readable instructions maintained in a non-transitory memory that when read by a machine, such as processors of a server, cause the machine to execute the instructions and thereby execute process 600. The processor of the server may include, but is not limited to, at least one processor of server 204, concierge intelligent orchestrator 302, concierge identity service 304, concierge blockchain server 306, or concierge conference server 308.

Process 600 begins and, in step 602, connects a customer (e.g., customer 202) and an agent (e.g., agent 208 and/or automated agent 210) to communicate therebetween. Step 604 monitors the communication content, such as to determine if a work item is present and, in test 606, determines if one or more third-party actions are required to resolve the work item. If test 606 is determined in the negative, processing continues to step 612. If test 606 is determined in the affirmative, processing continues to step 608 wherein a workflow is generated to resolve the work item. Optionally, step 608 may be one host action of a workflow or partial workflow to be completed in step 608. Step 610 communicates the workflow to the one or more third parties or specific workflow actions to be performed by a particular third party. Step 610 may comprise encoding third-party actions as blocks and adding the blocks to a block chain (e.g., concierge blockchain 312). Step 612 performs any host actions. Host actions are actions of a workflow that may be processed by a host (e.g., contact center 102) or otherwise not required to be performed by any third party. Additionally or alternatively, step 612 may include any actions required to be performed by customer 202.

Figure 7:
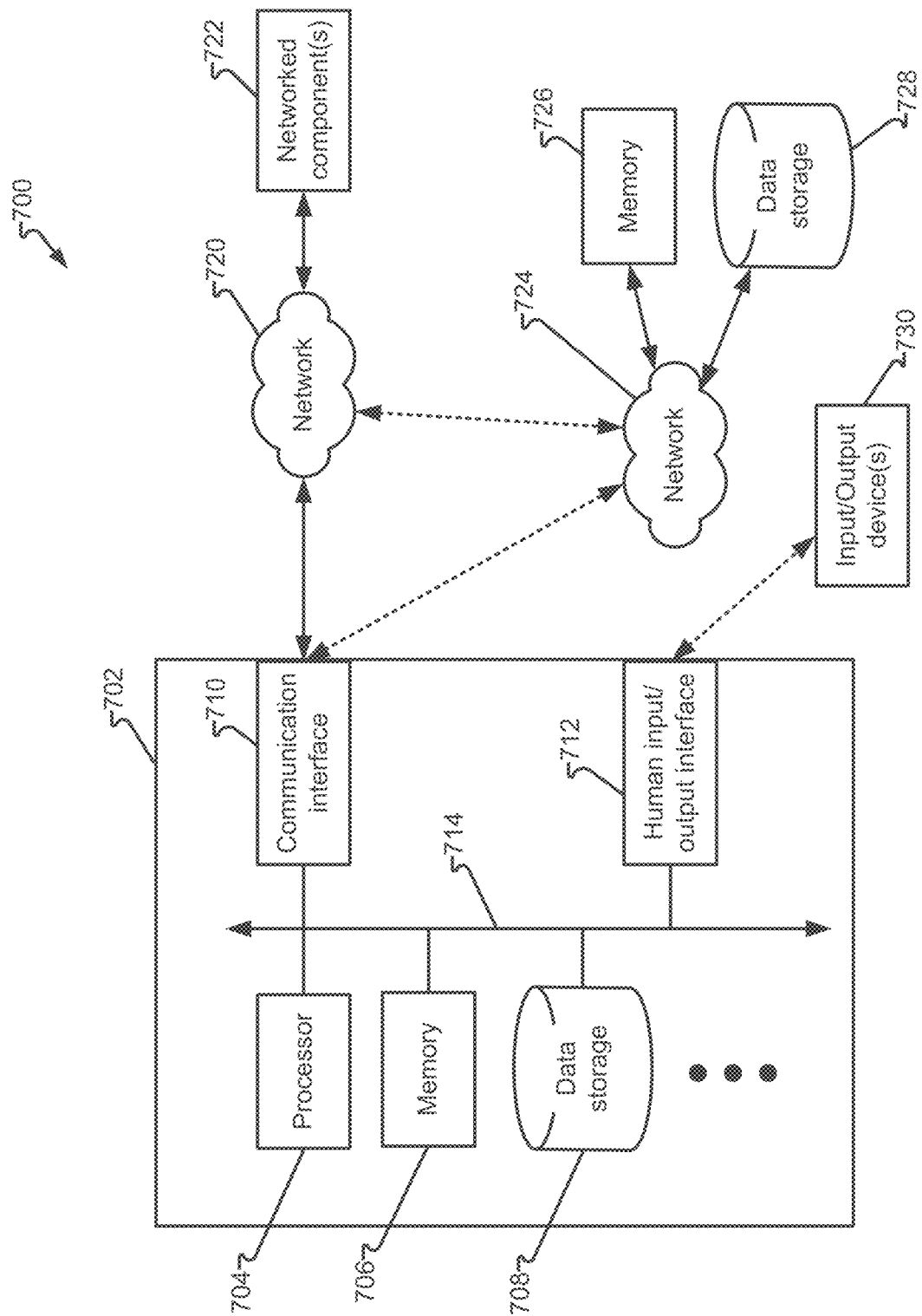
FIG. 7 depicts a system in accordance with embodiments of the present disclosure.

FIG. 7 depicts device 702 in system 700 in accordance with embodiments of the present disclosure. In one embodiment, server 204, concierge intelligent orchestrator 302, concierge identity service 304, concierge blockchain server 306, and/or concierge conference server 308 may be embodied, in whole or in part, as device 702 comprising various components and connections to other components and/or systems. The components are variously embodied and may comprise processor 704. The term "processor," as used herein, refers exclusively to electronic hardware components comprising electrical circuitry with connections (e.g., pin-outs) to convey encoded electrical signals to and from the electrical circuitry. Processor 704 may comprise programmable logic functionality, such as determined, at least in part, from accessing machine-readable instructions maintained in a non-transitory data storage, which may be embodied as circuitry, on-chip read-only memory, memory 706, data storage 708, etc., that cause the processor 704 to perform the steps of the instructions. Processor 704 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 714, executes instructions, and outputs data, again such as via bus 714. In other embodiments, processor 704 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 704 is a non-transitory computing device (e.g., electronic machine comprising circuitry and connections to communicate with other components and devices). Processor 704 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 704). Processor 704 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 704, device 702 may utilize memory 706 and/or data storage 708 for the storage of accessible data, such as instructions, values, etc. Communication interface 710 facilitates communication with components, such as processor 704 via bus 714 with components not accessible via bus 714. Communication interface 710 may be embodied as a network port, card, cable, or other configured hardware device. Additionally or alternatively, human input/output interface 712 connects to one or more interface components to receive and/or present information (e.g., instructions, data, values, etc.) to and/or from a human and/or electronic device. Examples of input/output devices 730 that may be connected to input/output interface include, but are not limited to, keyboard, mouse, trackball, printers, displays, sensor, switch, relay, speaker, microphone, still and/or video camera, etc. In another embodiment, communication interface 710 may comprise, or be comprised by, human input/output interface 712. Communication interface 710 may be configured to communicate directly with a networked component or configured to utilize one or more networks, such as network 720 and/or network 724.

Communication Network 104 may be embodied, in whole or in part, as network 720. Network 720 may be a wired network (e.g., Ethernet), wireless (e.g., WiFi, Bluetooth, cellular, etc.) network, or combination thereof and enable device 702 to communicate with networked component(s) 722. In other embodiments, network 720 may be embodied, in whole or in part, as a telephony network (e.g., public switched telephone network (PSTN), private branch exchange (PBX), cellular telephony network, etc.).

Additionally or alternatively, one or more other networks may be utilized. For example, network 724 may represent a second network, which may facilitate communication with components utilized by device 702. For example, network 724 may be an internal network to a business entity or other organization, such as contact center 102, whereby components are trusted (or at least more so) than networked components 722, which may be connected to network 720 comprising a public network (e.g., Internet) that may not be as trusted.

Components attached to network 724 may include memory 726, data storage 728, input/output device(s) 730, and/or other components that may be accessible to processor 704. For example, memory 726 and/or data storage 728 may supplement or supplant memory 706 and/or data storage 708 entirely or for a particular task or purpose. As another example, memory 726 and/or data storage 728 may be an external data repository (e.g., server farm, array, "cloud," etc.) and enable device 702, and/or other devices, to access data thereon. Similarly, input/output device(s) 730 may be accessed by processor 704 via human input/output interface 712 and/or via communication interface 710 either directly, via network 724, via network 720 alone (not shown), or via networks 724 and 720. Each of memory 706, data storage 708, memory 726, data storage 728 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 730 may be a router, a switch, a port, or other communication component such that a particular output of processor 704 enables (or disables) input/output device 730, which may be associated with network 720 and/or network 724, to allow (or disallow) communications between two or more nodes on network 720 and/or network 724. For example, a connection between one particular customer, using a particular customer communication device 108, may be enabled (or disabled) with a particular networked component 722 and/or particular resource 112. Similarly, one particular networked component 722 and/or resource 112 may be enabled (or disabled) from communicating with a particular other networked component 722 and/or resource 112, including, in certain embodiments, device 702 or vice versa. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a server;
a network interface to a network; and
wherein at least one processor of the server performs:
  connecting, via the network, to a customer communication device for a communication comprising an audio portion comprising speech provided by a customer utilizing the customer communication device and wherein the communication is a real-time communication;
  analyzing the speech to identify a work item;
  upon determining the work item requires an action from a third party, analyzing the speech to identify the third party;
  constructing a workflow comprising a number of steps that, when each step has been completed, resolves the work item;
  providing at least one third-party step of the number of steps to the third party that, when complete, performs the action; and
  performing at least one host step of the number of steps.

2. The system of claim 1, wherein analyzing the speech to identify the work item comprises providing the speech to a neural network trained to identify work items and receiving the work item therefrom.

3. The system of claim 2, wherein the neural network is trained, comprising at least one processor executing a computer-implemented method of training a neural network for work item identification comprising:
  collecting a set of work items from a database;
  applying one or more transformations to each work item including substituting a word with a synonymous word, substituting a word with a synonymous phrase, substituting a purpose for a topic associated with the purpose, substituting the topic associated with the purpose of the communication with the purpose, inserting at least one redundant word, removing at least one redundant word, removing a first unique topic, and adding a second unique topic to create a modified set of work items;
  creating a first training set comprising the collected set of work items, the modified set of work items, and a set of customer provided content absent work items;
  training the neural network in a first stage of training using the first training set;
  creating a second training set for a second stage of training comprising the first training set and customer provided content absent work items that are incorrectly detected as comprising a work item after the first stage of training; and
  training the neural network in the second stage of training using the second training set.

4. The system of claim 1, wherein analyzing the speech to identify the third party comprises providing the speech to a neural network trained to identify third parties and receiving the third party therefrom.

5. The system of claim 4, wherein the neural network is trained, comprising at least one processor executing a computer-implemented method of training a neural network for work item identification comprising:
  collecting a set of third-party actions from a database;
  applying one or more transformations to a third-party action including substituting a third-party service for a third-party name, substituting a third-party name for a third-party service, substituting a third-party action for a third-party name, substituting a third-party name for a third-party action, substituting a work item topic for a third-party name, and substituting a third-party name for a work item subject to create a modified set of work items;
  creating a first training set comprising the collected set of third-party actions, the modified set of work items, and a set of communication content absent a third-party action;
  training the neural network in a first stage of training using the first training set;
  creating a second training set for a second stage of training comprising the first training set and host actions that are incorrectly determined as third-party actions after the first stage of training; and
  training the neural network in the second stage of training using the second training set.

6. The system of claim 1, wherein the communication includes an automated agent engaging in the communication with the customer.

7. The system of claim 1, wherein the communication includes an agent communication device utilized by an agent to engage in the communication with the customer.

8. The system of claim 1, wherein the action is encoded as encrypted blocks and added to a blockchain.

9. The system of claim 8, wherein at least one of the encrypted blocks comprises a self-executing smart contract in response to determining an corresponding action has been completed.

10. The system of claim 1, wherein upon determining the work item requires the action from the third party, joining a third-party communication device to the communication and conducting a portion of the communication therewith.

11. A method, comprising:
  connecting, via a network, to a customer communication device for a communication comprising an audio portion comprising speech provided by a customer utilizing the customer communication device and wherein the communication is a real-time communication;
  analyzing the speech to identify a work item;
  upon determining the work item requires an action from a third party, analyzing the speech to identify the third party;
  constructing a workflow comprising a number of steps that, when each step has been completed, resolves the work item; and
  providing at least one third-party step of the number of steps to the third party that, when complete, performs the action.

12. The method of claim 11, wherein analyzing the speech to identify the work item comprises providing the speech to a neural network trained to identify work items and receiving the work item therefrom.

13. The method of claim 12, wherein the neural network is trained, comprising at least one processor executing a computer-implemented method of training a neural network for work item identification comprising:
  collecting a set of work items from a database;
  applying one or more transformations to each work item including substituting a word with a synonymous word, substituting a word with a synonymous phrase, substituting a purpose for a topic associated with the purpose, substituting the topic associated with the purpose of the communication with the purpose, inserting at least one redundant word, removing at least one redundant word, removing a first unique topic, and adding a second unique topic to create a modified set of work items;

creating a first training set comprising the collected set of work items, the modified set of work items, and a set of customer provided content absent work items;

training the neural network in a first stage of training using the first training set;

creating a second training set for a second stage of training comprising the first training set and customer provided content absent work items that are incorrectly detected as comprising a work item after the first stage of training; and training the neural network in the second stage of training using the second training set.

14. The method of claim 11, wherein analyzing the speech to identify the third party comprises providing the speech to a neural network trained to identify third parties and receiving the third party therefrom.

15. The method of claim 14, wherein the neural network is trained, comprising at least one processor executing a computer-implemented method of training a neural network for work item identification comprising:

collecting a set of third-party actions from a database;

applying one or more transformations to a third-party action including substituting a third-party service for a third-party name, substituting a third-party name for a third-party service, substituting a third-party action for a third-party name, substituting a third-party name for a third-party action, substituting a work item topic for a third-party name, and substituting a third-party name for a work item subject to create a modified set of work items;

creating a first training set comprising the collected set of third-party actions, the modified set of work items, and a set of communication content absent a third-party action;

training the neural network in a first stage of training using the first training set;

creating a second training set for a second stage of training comprising the first training set and host actions that are incorrectly determined as third-party actions after the first stage of training; and training the neural network in the second stage of training using the second training set.

16. The method of claim 11, wherein the communication includes an automated agent engaging in the communication with the customer.

17. The method of claim 11, wherein the communication includes an agent communication device utilized by an agent to engage in the communication with the customer.

18. The method of claim 11, wherein the action is encoded as encrypted blocks and added to a blockchain.

19. The method of claim 11, wherein upon determining the work item requires the action from the third party, joining a third-party communication device to the communication and conducting a portion of the communication therewith.

20. A system, comprising:

means to connect a customer communication device for a communication comprising an audio portion comprising speech provided by a customer utilizing the customer communication device and wherein the communication is a real-time communication;

means to analyze the speech to identify a work item;

means to, upon determining the work item requires an action from a third party, analyze the speech to identify the third party;

means to construct a workflow comprising a number of steps that, when each step has been completed, resolves the work item; and means to provide at least one third-party step of the number of steps to the third party that, when complete, performs the action.

* * * * *